Nov. 9, 1971  D. H. BENINGA  3,618,357
COMPOSITE CAPSTAN ASSEMBLY
Filed April 30, 1970

INVENTOR.
Duane H. Beninga
BY
Barnard, McGlynn & Reising
ATTORNEYS

United States Patent Office 3,618,357
Patented Nov. 9, 1971

3,618,357
COMPOSITE CAPSTAN ASSEMBLY
Duane H. Beninga, Arvada, Colo., assignor to Coors Porcelain Company, Golden, Colo.
Filed Apr. 30, 1970, Ser. No. 33,235
Int. Cl. B21c 1/02
U.S. Cl. 72—289                                        7 Claims

ABSTRACT OF THE DISCLOSURE

A capstan comprising a ceramic ring having a plurality of openings therethrough and having bonded to each of the side walls thereof a ring of another material having greater crack resistance than that of the ceramic ring and having a greater outside diameter than that of the ceramic ring such that the rings of other material provide radially outwardly extending annular flanges on each side of the ceramic ring, at least the inner surface of each of the rings of other material being an organic resin which extends through said openings thereby providing a unitary organic resin body which is mechanically interlocked with the ceramic ring. In the preferred embodiment the rings of other material are formed entirely of organic resin and the ceramic ring has a thin layer of metal thereon to increase the bond strength between the ceramic ring and the resin. An assembly of such composite capstans of decreasing diameter provides a stepped-cone draw block for wire drawing which has optimum wear resistance along with optimum resistance to breakage and yet which can be manufactured simply and at a low cost. In the event there is breakage of the ceramic ring, the mechanical interlock with the resin body inhibits disintegration of the ceramic ring from centrifugal force even at high rotary speeds.

---

Figure 1:
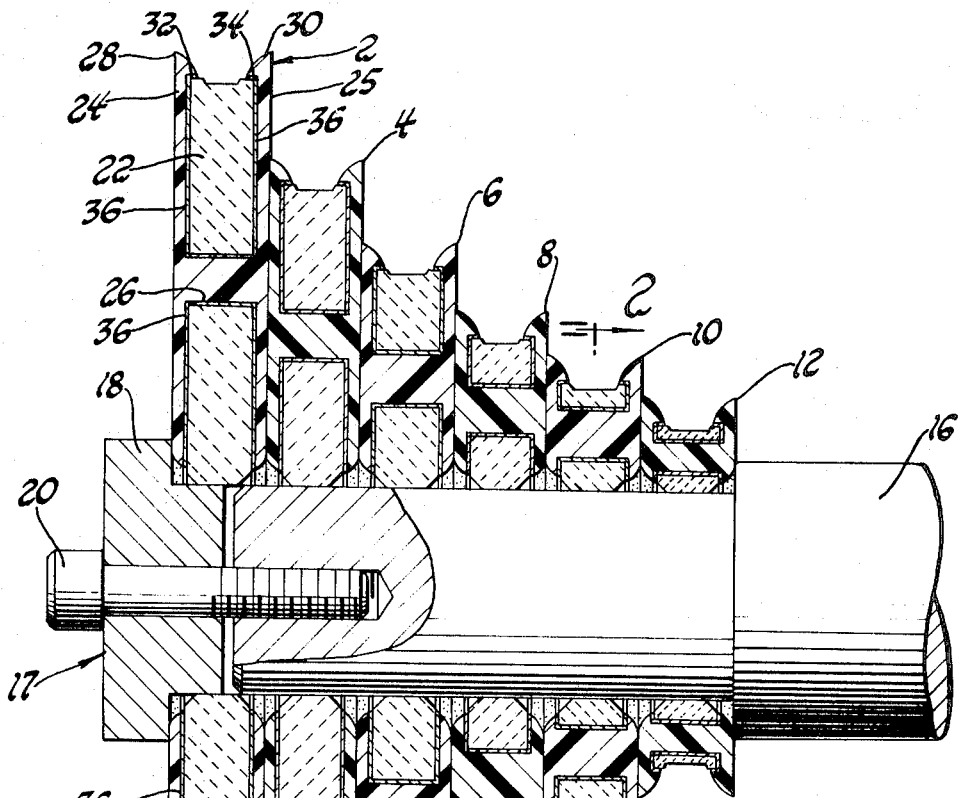

The subject matter of the present invention is an improved capstan and capstan assembly primarily for use in wire drawing operations.

In conventional wire drawing operations, a stepped-cone type draw block is utilized for drawing the wire through the dies wherein the thickness of the wire is progressively diminished. For efficient operation it is essential that such drawing blocks have extremely high wear resistance and for this reason it has been conventional to form them of a hard ceramic. However, this is expensive and has other disadvantages as well, particularly in that while hard ceramic has extremely excellent wear resistance, it is deficient, as compared with other materials such as metal, in the matter of resistance to breakage. In other words, whereas ceramic is extremely hard and hence wear resistant, it is subject to breakage. Each step on the stepped-cone draw block is required to have edge flanges to assure that the wire does not run off of the step, and the edge flanges, being of relatively thin cross section, are particularly subject to breakage. Each step on the stepped-cone draw block is required to have edge flanges to assure that the wire does not run off of the step, and the edge flanges, being of relatively thin cross section, are particularly subject to breakage.

It has been proposed to form wire drawing capstans and stepped-cone draw blocks from an assembly of ceramic rings and metal rings such that the metal rings provide the edge flanges. However, because heat is generated by the frictional contact of the wire being drawn, and because metal and ceramic have different coefficients of thermal expansion, it has been necessary in assembled metal-ceramic capstans and draw blocks to provide some spacing between portions of the metal rings and portions of the ceramic rings in order to allow for the differential in expansion of the materials during operation. This, in turn, requires rather close tolerances and, hence, added expense in manufacture.

It is an object of the present invention to provide an improved capstan and capstan assembly which can be manufactured at relatively low cost but which provides optimum wear resistance along with optimum resistance to breakage, and which further assures against disintegration of the capstan due to centrifugal force even when there is a failure at high rotational speeds.

Briefly, this is accomplished, in accordance with the invention, by a composite capstan wherein a hard ceramic ring with openings therethrough has bonded to the side walls thereof rings of another material which has greater toughness than the ceramic and which rings are of a greater diameter than that of the ceramic ring so as to provide the required edge flanges. Further, in accordance with the invention, at least the inner surfaces of the rings of other material and preferably such rings in their entirety, are of an organic resin which extends through the openings in the ring so as to provide a unitary resin body which is mechanically interlocked with the ceramic ring. Further, the side walls of the ceramic rings are preferably provided with a strongly bonded thin deposit of metal to thereby increase the bond strength between the ceramic and the organic resin. In one embodiment, the organic resin not only covers and is bonded to the side walls and the openings of the ceramic ring but also covers and is bonded to the inner wall or central bore of the ceramic ring.

Figure 3:
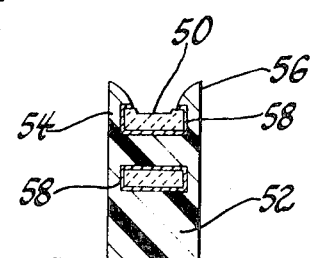
Figure 2:
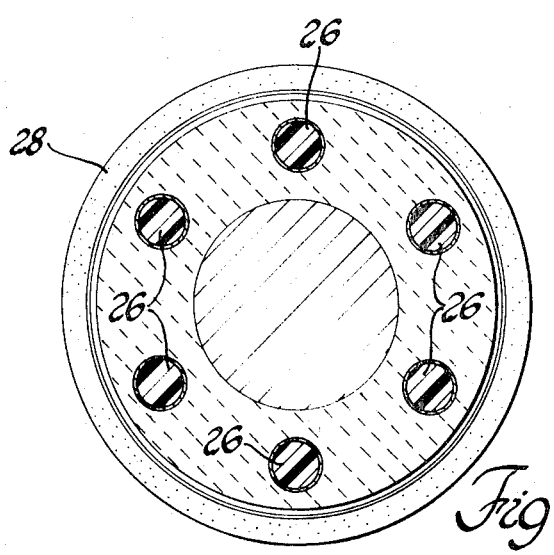

Other objects, features and advantages of the invention will appear more clearly from the following detailed description made with reference to the drawings in which:

FIG. 1 is a side view in partial section of a stepped-cone draw block assembly of capstans embodying the invention and mounted on a shaft; and FIG. 2 is an end view of one component of one of the capstans of the FIG. 1 assembly; and FIG. 3 is a cross-sectional view of another embodiment of the invention.

Referring now to FIG. 1, the draw block assembly shown comprises a plurality of axially aligned composite capstans, 2, 4, 6, 8, 10 and 12, of decreasing diameter, from left to right as shown, and mounted on a shaft 16 with their flat side surfaces in abutting relationship with each other. An end fitting 17 on the shaft having a portion 18 of an increased diameter is removably secured to the shaft by a threaded fastener 20 to enable removal of the capstans, or any of them, from the shaft when replacement is necessary. All of the capstans are of substantially identical construction except for the difference in the diameters thereof and hence a detailed description of the capstan 2 will serve as a description of the others as well.

The capstant 2 comprises a flat-sided ceramic ring 22 sandwiched between rings 24 and 25 of organic resin. As can best be seen in FIG. 2, the ceramic ring 22 has a plurality of equally spaced openings 26 therethrough, arranged in a circular pattern and extending from one flat side to the other of the ring 22. The arrangement of the openings should of course be such that the ceramic ring is balanced, i.e. has uniform weight distribution therearound. The rings 24 and 25 are of larger diameter than the ring 22 thereby providing radially outwardly extending annular edge flanges 28 and 30 which are of increased thickness and which therefore cover the edge portions 32 and 34 of the outer circumferential surface of the ceramic ring 22. Further in accordance with the invention, the rings 24 and 25 comprise a unitary organic resin body which fills the openings 26 in the ceramic ring 22. Hence even if there should be failure of the ceramic ring due to cracking, the ceramic will nevertheless be held in place, even at high rotational speeds due to the mechanical interlock of the resin body with the ceramic. Each of the flat side surfaces of the ceramic ring 22, and preferably also each of the edge portions 32 and 34 and the surface of each of the openings 26 has a thin layer of metal 36 bonded thereto and the rings of organic resin are bonded to these metalized surfaces of the ceramic ring. As hereinafter described in greater detail, the thin metal layer on the ceramic ring greatly increases the bond strength between the organic resin and the ceramic.

In the embodiment shown in FIG. 1 wherein the inner peripheral surface of the ceramic ring constitutes the inner peripheral surface of the capstan and hence wherein the ceramic rings are in contact with the shaft, the shaft can, if desired, be provided with a longitudinally extending keyway and each of the ceramic rings can be provided with a radially inwardly extending projection which mates into the keyway to lock the capstans to the shaft for rotation therewith. However such a keyway lock is generally not essential since the capstans are held in tight face to face engagement with each other by reason of the tightening of end fitting 17 which is locked to the shaft thereby assuring rotation of the entire draw block assembly with the shaft.

For most applications, by far the preferred ceramic for the ceramic rings is sintered alumina base ceramic. Sintered alumina base ceramic contains upwards of about 85% by weight aluminum oxide. Where the body consists of less than 100% aluminum oxide, the remaining ingredients can be any of a variety of other oxides or mixed oxides or the like which by interaction with surface portions of the aluminum oxide gains during the sintering operation function as glass forming ingredients to provide an interstitial glassy phase, or as mineralizers to control alumina crystal grain growth. Specific examples of high alumina ceramic compositions useful for the practice of the invention are as follows, the percentages specified always being by weight; 100% aluminum oxide; 99.5% aluminum oxide, .5% chromium oxide; 94% aluminum oxide, 3% magnesium oxide; 90% aluminum oxide, 4% silica, 3% calcium oxide, 3% talc; 85% aluminum oxide, 10% clay, 5% calcium oxide.

Such high alumina rings, sintered to non-porous construction, with a density upwards of about 3.4 grams per cubic centimeter, are extremely hard and wear resistant as compared with other ceramics.

Whereas sintered alumina base ceramic, as described is generally preferred for the ceramic rings, other ceramics can be used if desired. xamples of other ceramics are sintered zirconium oxide, sintered beryllium oxide, tungsten carbide and silicon carbide though, as indicated above, aluminum oxide base ceramic is preferred for the practice of the invention.

The preferred organic resin for the rings 24 and 25 is dense polyurethane though other organic resins can be used if desired. For example, highly vulcanized and therefore relatively hard natural or synthetic rubber having carbon black or other reinforcing fillers can be used if desired. As another example, acetal resin made by the polymerization of formaldehyde, and currently sold under the trademark Delrin by E. I. du Pont de Nemours of Wilmington, Del. can be used. But whether the rings 24 and 26 be of polyurethane, as is preferred, or of other resin, it is desirable that the resin having the following physical properties: minimum tensile strength, 2000 p.s.i.; maximum compression set, 20%; maximum cold flow, 20% minimum hardness, 40 Shore A; maximum hardness, 150 Rockwell R; minimum compressive strength, 5,000 p.s.i.; minimum tear strength, 50 p.l.i.; minimum impact resistance, 10 ft. lbs. per inch (Izod test method, ASTM D–256); compression modulus, at least 200 p.s.i. for a 10% deflection.

The impact resistance and hence the toughness of the organic resin rings is considerably greater than that of the ceramic and hence the resin rings are far less subject to cracking than is the ceramic ring 22. This is an especially important property for the radially outwardly extending flanges 26 and 28.

Where alumina base ceramic is used the preferred metal for the metal layers 36 is either titanium or zirconium, ideally the former, and such metal is preferably applied by physically abrading or rubbing the metal in forced contact with the ceramic surfaces whereby the metal is deposited over substantially the entire surfaces of the ceramic ring to which the resin is bonded. The titanium or zirconium chemically bonds to the alumina ceramic. Examples of other metals which can be used, and applied in the same manner, though not with equal effect, are aluminum, copper, brass, and zinc. Also, particularly where the ceramic is aluminum oxide base, the metal layers can be applied by metalizing techniques currently used to provide alumina ceramic bodies with electrically conductive paths for use as electrical circuit components. For example, lithium molybdate or a slurry of manganese and molybdenum or tungsten powder can be applied and the ceramic ring then heated in a wet reducing atmosphere thereby to provide a strongly bonded metal layer. The bond strength between the organic resin and the metalized surfaces of the ceramic ring is excellent and hence even though there should be failure due to cracking of the ceramic ring during operation, the ceramic is retained to the organic resin. This is further augmented by the mechanical interlock between the resin and the ceramic ring as aforesaid.

Referring now to FIG. 3, the capstan structure shown is the same as in FIG. 1 except that the radial thickness of the ceramic ring 50 is relatively small and the radially inner portion 52 of the capstan is formed of and integral with the organic resin which constitutes the organic resin rings 54 and 56. The metal layer, preferably titanium, is shown at 58 though in this embodiment, as in the FIG. 1 embodiment, the thickness of the layer is much exaggerated simply for purposes of illustration. The FIG. 3 embodiment has the advantage that the bulk of the capstan instead of being of the relatively expensive ceramic is of the less expensive organic resin. However, the strength of the FIG. 3 embodiment is less than that of FIG. 1 since the compressive strength of organic resin is less than that of ceramic and in the FIG. 1 embodiment the ceramic extends all the way to the I.D. of the capstan.

To manufacture the capstans, the resin can be molded against the side walls and into the openings of the ceramic ring, all in accordance with techniques well known in the art for molding and bonding elastomers or other organic resins.

It is within the purview of the invention to form the outer rings of a composite of metal and resin rather than entirely of resin. That is, sheet metal rings can if desired be bonded to the organic resin rings such that each of the resin rings is sandwiched between the ceramic ring and one of the metal rings.

The capstans of this invention find particular utility for wire drawing though they are of general utility as capstans, sheaves or pulleys and for numerous other uses as well.

It will be understood that while the invention has been described specifically with reference to certain preferred embodiments thereof, various changes may be made all within the full and intended scope of the claims which follow.

I claim:

1. A capstan comprising a ceramic ring having a plurality of openings therethrough and having bonded to each of the side walls thereof a ring which is of a material having a greater toughness than that of the ceramic ring and which is of greater diameter than that of said ceramic ring so as to provide radially outwardly extending annular edge flanges on said capstan, at least the inner surfaces of said rings of other material being formed of an organic resin which fills said openings thereby providing a unitary organic resin body which is mechanically interlocked with said ceramic ring.

2. A capstan as set forth in claim 1 wherein the side walls of the ceramic ring have a thin layer of metal thereon to provide increased bond strength between said ceramic ring and said organic resin.

3. A capstan as set forth in claim 1 wherein said openings are equally spaced from each other and are arranged in a circular pattern.

4. A capstan as set forth in claim 1 wherein the inner peripheral surface of the ceramic ring constitutes the inner peripheral surface of the capstan.

5. A capstan as set forth in claim 1 wherein the organic resin rings constitute a portion of an organic body which covers and is bonded to the inner circumferential surface of said ceramic ring.

6. A capstan as set forth in claim 2 wherein said ceramic is sintered alumina base ceramic.

7. A capstan as set forth in claim 2 wherein said organic resin is polyurethane.

References Cited
UNITED STATES PATENTS

| | | | |
|---|---|---|---|
| 1,737,345 | 11/1929 | Tideman | 72—289 X |
| 1,973,596 | 9/1934 | Yousey | 72—289 X |

MILTON S. MEHR, Primary Examiner